(12) United States Patent
Shiohara

(10) Patent No.: US 8,482,658 B2
(45) Date of Patent: Jul. 9, 2013

(54) CAMERA FOR GENERATING COMPOSITE IMAGE BY SUPERIMPOSING PARTIAL IMAGE AND METHOD FOR MANUFACTURING SAME

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 199 days.

(21) Appl. No.: 12/976,022

(22) Filed: Dec. 22, 2010

(65) Prior Publication Data

US 2011/0157403 A1    Jun. 30, 2011

(30) Foreign Application Priority Data

Dec. 25, 2009  (JP) .................................. 2009-295203

(51) Int. Cl.
*H04N 5/232* (2006.01)
*H04N 5/222* (2006.01)

(52) U.S. Cl.
USPC ..................................... 348/349; 348/333.05

(58) Field of Classification Search
USPC ............ 348/345–356, 42, 51, 333.01–333.11
See application file for complete search history.

(56) References Cited

U.S. PATENT DOCUMENTS

| | | | | |
|---|---|---|---|---|
| 4,231,647 A * | 11/1980 | Kitai et al. | ..................... | 396/103 |
| 4,599,653 A * | 7/1986 | Kimura et al. | ................. | 348/346 |
| 5,682,198 A * | 10/1997 | Katayama et al. | .............. | 348/47 |
| 2003/0020814 A1 * | 1/2003 | Ono | ............................ | 348/220.1 |
| 2003/0160886 A1 * | 8/2003 | Misawa et al. | ................. | 348/347 |
| 2005/0134709 A1 * | 6/2005 | Ishii et al. | ................. | 348/240.99 |
| 2005/0145772 A1 * | 7/2005 | Abe | ............................ | 250/201.2 |
| 2006/0092505 A1 * | 5/2006 | Abnet et al. | .................... | 359/380 |
| 2006/0187312 A1 * | 8/2006 | Labaziewicz et al. | ...... | 348/218.1 |
| 2007/0064141 A1 * | 3/2007 | Misawa et al. | ........... | 348/333.01 |
| 2007/0064142 A1 * | 3/2007 | Misawa et al. | ........... | 348/333.01 |
| 2008/0030592 A1 * | 2/2008 | Border et al. | ............. | 348/218.1 |
| 2008/0084484 A1 * | 4/2008 | Ochi et al. | .................. | 348/222.1 |
| 2008/0158346 A1 * | 7/2008 | Okamoto et al. | ............... | 348/47 |
| 2008/0158384 A1 * | 7/2008 | Okamoto et al. | .......... | 348/231.2 |
| 2008/0218613 A1 * | 9/2008 | Janson et al. | .................... | 348/262 |
| 2009/0153649 A1 * | 6/2009 | Hirooka et al. | ................. | 348/47 |

FOREIGN PATENT DOCUMENTS

JP    2002-122907 A    4/2002

* cited by examiner

*Primary Examiner* — Sinh Tran
*Assistant Examiner* — Selam Gebriel
(74) *Attorney, Agent, or Firm* — Global IP Counselors, LLP

(57) ABSTRACT

A camera with a focusing function is provided. The camera includes a first imaging unit configured to generate a first image by a photoelectric conversion from an image of a subject obtained via a first lens, a second imaging unit configured to generate a second image by a photoelectric conversion from an image of the subject obtained via a second lens, where the second imaging unit being different from the first imaging unit, an focusing amount acquiring unit configured to acquire amount of focusing, a composite image generating unit configured to set a cutout position on the second image, to cut out an partial image at the cutout position, on the basis of the operation amount and a predetermined cutout rule, and to generate a composite image by superimposing the partial image on the first image, and an image display unit configured to display the composite image.

7 Claims, 11 Drawing Sheets

(a) Focus Misalignment (In Front)

(b) In Focus (c) Focus Misalignment (Inward)

CAMERA FOR GENERATING COMPOSITE IMAGE BY SUPERIMPOSING PARTIAL IMAGE AND METHOD FOR MANUFACTURING SAME

CROSS-REFERENCE TO THE RELATED APPLICATIONS

This application claims priority to Japanese Patent Application No. 2009-295203 filed on Dec. 25, 2009. The entire disclosure of Japanese Patent Application No. 2009-295203 is hereby incorporated herein by reference.

BACKGROUND

1. Technological Field

The present invention relates to a camera and a method for manufacturing the camera, and particularly relates to a camera capable of manual focusing, and to a method for manufacturing the camera.

2. Background Technology

In examples of this type of camera proposed in the past, a so-called double-image matching range finder is provided, the double-image matching range which includes a viewfinder optical system including a half mirror, and a range finder optical system for rotating in coupling with the manual focusing operation of an imaging lens using the principle of triangulation. Japanese Laid-open Patent Publication No. 2002-122907 discloses such camera, as an example. In such camera, the image used as the viewfinder image is an image in which a range finder image inputted from the range finder optical system is superimposed, via the half mirror, on a viewfinder image inputted from the viewfinder optical system.

SUMMARY

In the camera described above, the range finder optical system must be precisely rotated in coupling with the manual focusing operation, and a complex mechanism is therefore required. In such a mechanism, high precision is required in the manufacturing tolerances and assembly in the camera for each of the components of the mechanism, and time-consuming adjustment must be performed during assembly. When the accuracy of the mechanism is reduced by external impacts or other influences, the superposition of the double image in the viewfinder image is affected, but because of the complexity of the mechanism, it is difficult for the user to remedy the adverse effects.

A main object of the present invention is to provide a camera for generating a composite image in which two images are superimposed by a simple mechanism, and to provide a method for manufacturing the camera.

In order to achieve the above objects, the camera and method for manufacturing the camera according to the present invention is provided, as described below.

The camera is with a focusing function. The camera includes a first imaging unit configured to generate a first image by performing a photoelectric conversion from an image of a subject obtained via a first lens, a second imaging unit configured to generate a second image by performing a photoelectric conversion from an image of the subject obtained via a second lens, where the second imaging unit being different from the first imaging unit, an focusing amount acquiring unit configured to acquire amount of focusing, a composite image generating unit configured to set a cutout position on the second image, to cut out an partial image at the cutout position, on the basis of the operation amount and a predetermined cutout rule, and to generate a composite image by superimposing the partial image on the first image, and an image display unit configured to display the composite image.

DETAILED DESCRIPTION OF EXEMPLARY EMBODIMENTS

Figure 1:
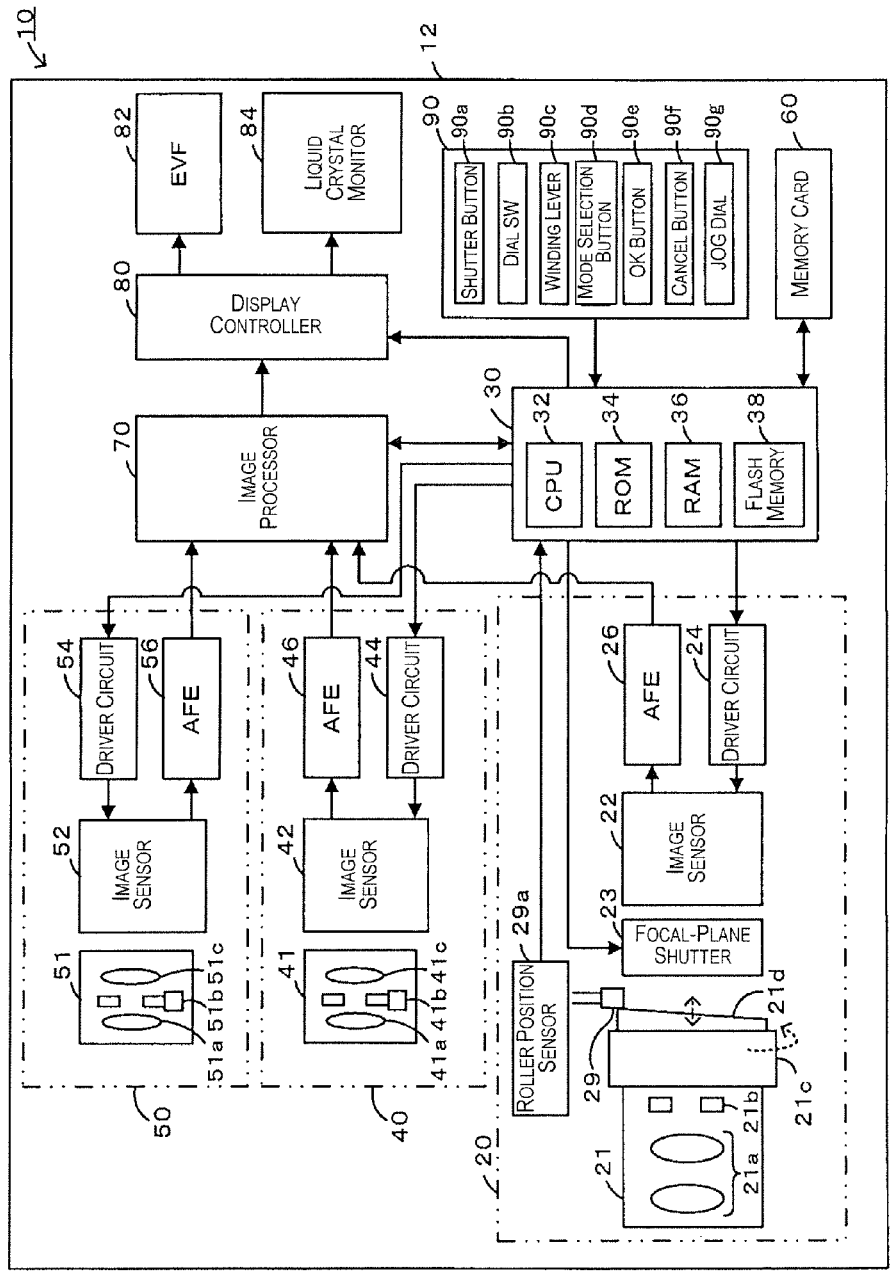
FIG. 1 is a view showing the overall configuration of the digital camera.
Figure 2:
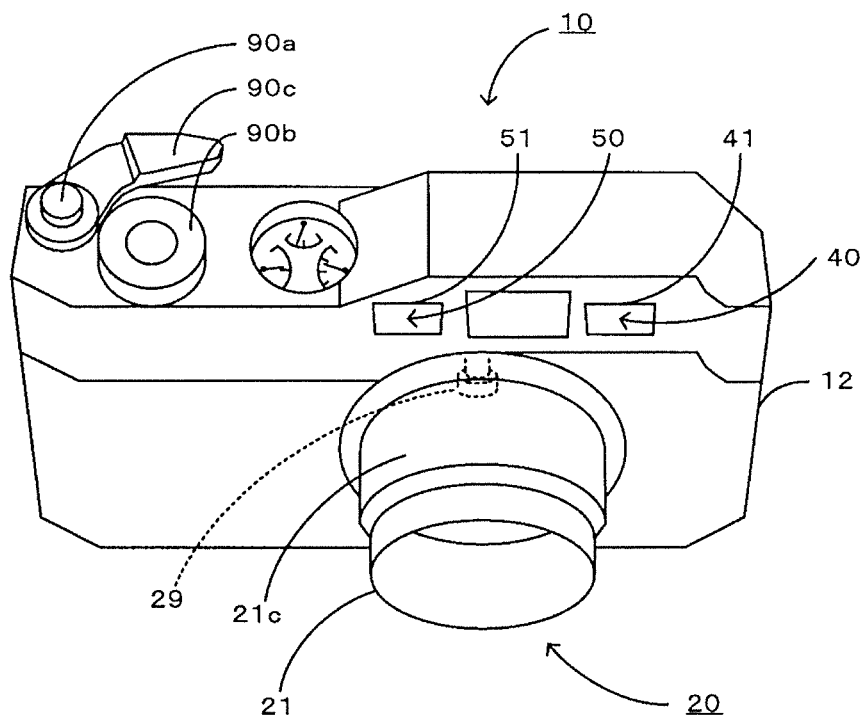
FIG. 2 is a perspective view showing the digital camera.
Figure 3:
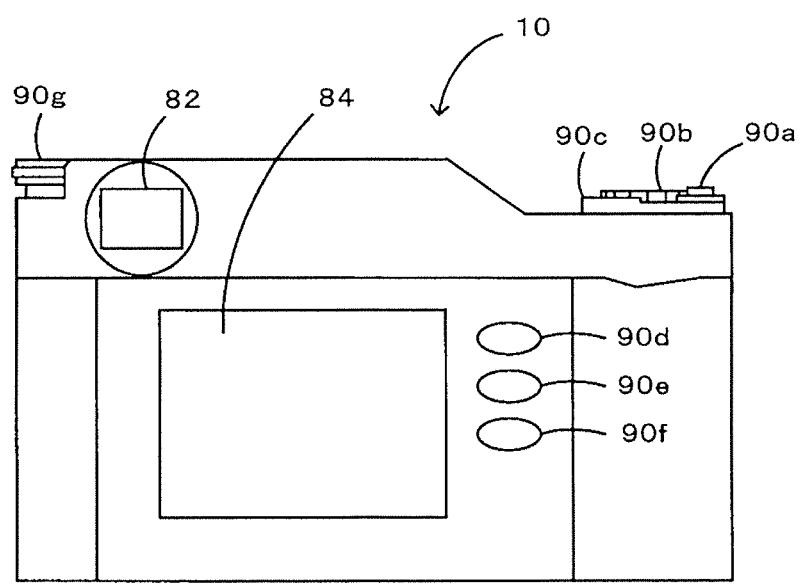
FIG. 3 is a rear view showing the digital camera.

Embodiments of the present invention will next be described based on the accompanying drawings. FIG. 1 is a view showing the overall configuration of a digital camera 10 as an embodiment of the present invention, FIG. 2 is a perspective view showing the digital camera 10, and FIG. 3 is a back view showing the digital camera 10.

The digital camera 10 of the present embodiment is provided with a main body 12, a main electronic imaging unit 20 for applying a photoelectric conversion to an image of a subject and outputting a digital signal as a captured image, a first sub-electronic imaging unit 40 for applying a photoelectric conversion to the subject and outputting a digital signal for generating a viewfinder image, a second sub-electronic imaging unit 50 for applying a photoelectric conversion to the subject and outputting a digital signal for generating a viewfinder image, in the same manner as the first sub-electronic imaging unit 40, an image processor 70 for receiving as inputs the signals outputted from the main electronic imaging unit 20 and the first and second sub-electronic imaging units 40, 50, performing predetermined image processing, and generating image data or an image file, a display controller 80 for displaying the image data inputted from the image processor 70 in an EVF (electronic view finder) 82 or a liquid crystal monitor 84, a group 90 of various types of operating switches operated by a user, a memory card 60 capable of storing an image file generated by the image processor 70, and a main controller 30 for controlling the device as a whole.

The main electronic imaging unit 20 is provided with an imaging lens 21 configured as a manual-focus lens interchangeably attached to the main body 12 via a lens mount not shown in the drawing, an image sensor 22 configured as a publicly known CCD image sensor for converting light inputted via the imaging lens 21 into an electrical signal by photoelectric conversion, a focal-plane shutter 23 disposed between the imaging lens 21 and the image sensor 22, a driver circuit 24 for driving the image sensor 22, and an analog front end (AFE) 26 for converting the electrical signal outputted from the image sensor 22 into a digital signal and outputting the digital signal. The image sensor 22 is configured as a sensor having millions to billions of pixels. A CCD image sensor is described as an example of the image sensor 22, but a CMOS-type image sensor may also be used.

The imaging lens 21 is provided with a lens group 21a including a combination of a convex lens and a concave lens, an aperture mechanism 21b for adjusting the quantity of light, a distance ring 21c which can be rotated (for focusing) by the user to change the focal point position, and an extending part 21d formed in a helical shape so that the amount of extension thereof changes according to the operation amount (amount of rotation) of the distance ring 21c, the extending part 21d being provided on the attachment side of the imaging lens 21. The optical axis of the imaging lens 21 is parallel to the bottom surface of the main body 12. Although not shown in the drawing, a distance scale is displayed on the external peripheral portion of the distance ring 21c. The extending part 21d is in contact with a coupled roller 29 provided so as to be capable of displacement in the forward and backward directions inside the main body 12. The operation amount of the distance ring 21c is therefore converted to the displacement amount of the coupled roller 29 via the amount of extension of the extending part 21d. A roller position sensor 29a capable of detecting the displacement amount of the coupled roller 29 is installed in the digital camera 10. The operation amount of the distance ring 21c is thereby detected as the detection value of the roller position sensor 29a. Specifically, a value that reflects the focus position of the main electronic imaging unit 20 (imaging lens 21) is detected, and this detection value is used thereafter as the operation amount So.

The first sub-electronic imaging unit 40 is provided with a pan-focus sub-lens 41 having lens groups 41a, 41c and an aperture mechanism 41b, an image sensor 42 including a publicly known CCD image sensor for converting the light inputted via the sub-lens 41 into an electrical signal by photoelectric conversion, a driver circuit 44 for driving the image sensor 42, and an AFE 46 for converting the electrical signal outputted from the image sensor 42 into a digital signal and outputting the digital signal. Since the second sub-electronic imaging unit 50 has the same configuration as the first sub-electronic imaging unit 40, the reference numerals used to refer to the constituent elements thereof are the reference numerals of the constituent elements of the first sub-electronic imaging unit 40 plus 10, and no description of the second sub-electronic imaging unit 50 will be given. The first and second sub-electronic imaging units 40, 50 are installed at substantially the same height from the bottom surface of the main body 12, in positions separated by a predetermined interval A inside the main body 12. The sub-lens 41 and the sub-lens 51 are installed at this time so that the optical axes thereof are parallel to the bottom surface of the main body 12. The image sensor 22 of the main electronic imaging unit 20 is configured as a sensor having millions to billions of pixels, whereas the image sensors 42, 52 are configured as sensors having 2 million pixels, for example, or another number of pixels on the order of hundreds of thousands to millions.

Although not shown in the drawing, the image processor 70 is provided with various types of image processing function blocks for executing publicly known image processing for a digital camera, such as color interpolation processing for RGB pixels, white balance processing, color reproduction processing, resizing, gamma correction, and image file generation processing. The image processor 70 performs such functions as applying image processing to the input of a digital signal outputted from the main electronic imaging unit 20 and generating a captured image, converting the generated capture image to a predetermined format and adding imaging information to generate an image file, applying image processing to the input of a digital signal outputted from the first sub-electronic imaging unit 40 and generating an original image GA, and applying image processing to the input of a digital signal outputted from the second sub-electronic imaging unit 50 and generating an original image GB. The image processor 70 is provided with a cutout processing unit for executing cutout processing for cutting out a partial image from the original image GB, and a synthesis processing unit for executing synthesis processing for superimposing the cut partial image on the center portion of the original image GA, and a viewfinder image GF for display in the EVF 82 is generated by superimposing the partial image cut out from the original image GB on the original image GA. The synthesis processing unit of the image processor 70 is capable of so-called α blending whereby a coefficient α indicating the transparency of the image to be superimposed on top of the bottom image is used to mix the pixel values of the bottom image with the pixel values of the top image to generate pixel values of a composite image.

The display controller 80 performs such functions as displaying the viewfinder image GF generated by the image processor 70 in the EVF 82, and displaying the captured image generated by the image processor 70, and a captured image in the image file stored in the memory card 60 in the liquid crystal monitor 84. The display controller 80 is also capable of enlargement processing for enlarging a specific portion of the viewfinder image GF for display in the EVF 82.

The operating switch group 90 includes a shutter button 90a and dial switch (SW) 90b, a winding lever 90c, a mode selection button 90d, an OK button 90e, a cancel button 90f, and a JOG dial 90g. The shutter button 90a is a button for receiving an instruction from a user to import an image formed on the image sensor 22 through the imaging lens 21. The dial switch 90b is a switch whereby the user sets various types of settings relating to imaging, such as the shutter speed or an exposure value. The winding lever 90c is a button for returning a shutter curtain (not shown) of the focal-plane shutter 23 from a state in which the shutter is disconnected to a state in which the next shutter operation is possible, and mechanically fixing the shutter in the ready state, by a winding operation. The mode selection button 90d is a button for selecting various modes. Selectable modes include a setting mode in which the brightness of the liquid crystal monitor 84 and various other settings are available, a correction mode for correcting the cutout rule Rk which is used to generate the viewfinder image GF, and other modes. The cutout rule Rk is described hereinafter. The OK button 90e is a button for determining various types of selections, and the cancel button 90f is a button for canceling a selection which has been made. The JOG dial 90g, when rotated, moves a cursor for selecting various items displayed on the liquid crystal monitor 84, and changes the numerical values of various types of settings. The JOG dial 90g can either be drawn upward or pressed downward, and functions as a dial for scrolling the image displayed on the liquid crystal monitor 84 up and down when the dial is rotated in the upward-drawn state, and as a dial for scrolling the image left and right when the dial is rotated in the downward-pressed state.

The main controller 30 is configured as a microprocessor centered around a CPU 32, and is provided with a ROM 34 for storing a processing program and various types of tables, a RAM 36 for temporarily storing data, a flash memory 38 for retaining data in rewritable fashion even when the power supply is turned off, and an input/output port and communication port not shown in the drawing. A cutout rule Rk used to generate the viewfinder image GF is registered in the flash memory 38. Various operating signals from the operating switch group 90, the operation amount So from the coupled roller 29, image files read from the memory card 60, various images from the image processor 70, and other information is inputted to the main controller 30. From the main controller 30 are outputted a shutter drive signal to the focal-plane shutter 23, control signals to the driver circuits 24, 44, 54, image files to be written to the memory card 60, image processing commands to the image processor 70, display control commands to the display controller 80, and other information.

Figure 4:
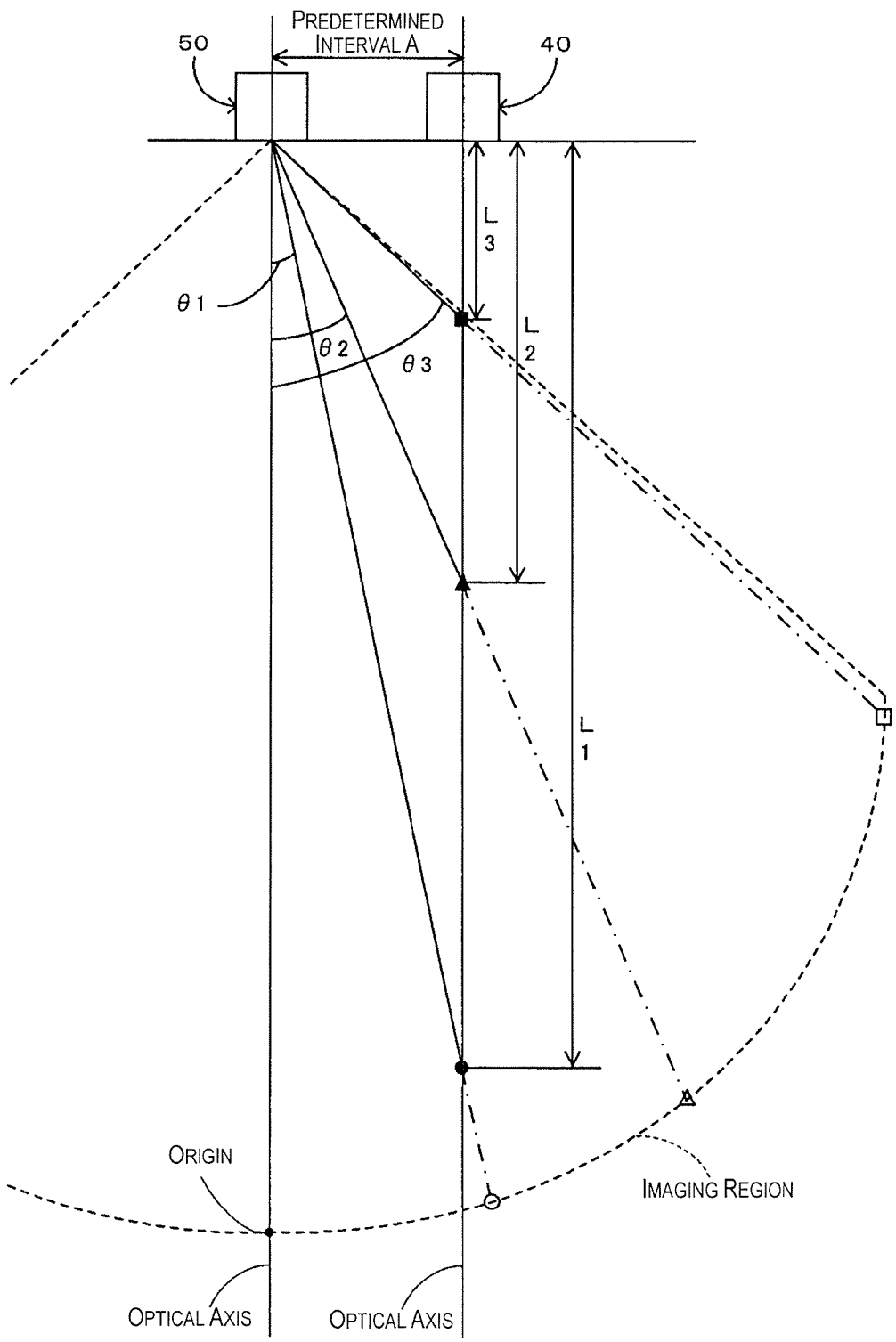
FIG. 4 is a view showing the concept of the method for generating the cutout rule.
Figure 5:
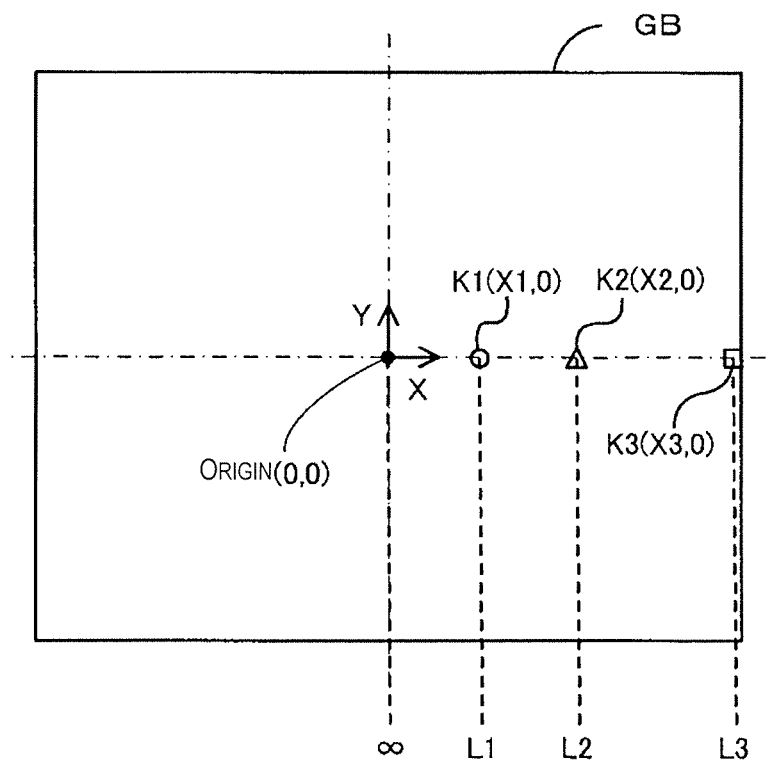
FIG. 5 is a view showing an example of the cutout position in the original image.

The cutout rule Rk will next be described. The cutout rule Rk is a rule for setting the cutout position K at which a partial image is cut out from the original image GB in accordance with a focusing operation in order to generate the viewfinder image GF. FIG. 4 is a view showing the concept of the method for generating the cutout rule Rk, and FIG. 5 is a view showing an example of the cutout position K in the original image GB. The region indicated by dotted lines in FIG. 4 represents the image in the imaging region of the second sub-electronic imaging unit 50. As shown in FIG. 4, a subject (indicated by a black circle in FIG. 4, and the same hereinafter) in a position at a distance L1 on the optical axis of the first sub-electronic imaging unit 40 is photographed at a position (indicated by a white circle) of an imaging region at an angle θ1 from the optical axis of the second sub-electronic imaging unit 50. In the same manner, a subject (indicated by a black triangle) at a distance L2 is photographed at a position (indicated by a white triangle) at an angle θ2, and a subject (indicated by a black square) at a distance L3 is photographed at a position (indicated by a white square) at an angle θ3. The angles θ, distances L, and the predetermined interval A are related by Equation (1) according to a triangulation principle, and since the predetermined interval A is a known constant, the angles θ can be calculated when the distances L are determined. As shown in FIG. 5, when an XY coordinate system having the center of the original image GB (imaging region) as the origin is set with the X axis in the left-right direction and the Y axis in the up-down direction of FIG. 5, the position of the subject image in the original image GB moves farther from the origin the closer the distance is from the digital camera 10 to the subject, and closer to the origin the farther the digital camera 10 is from the subject, and the position of the subject image coincides with the origin when the subject is at infinite distance. In order to match the left-right direction of the imaging region shown in FIG. 4, FIG. 5 shows the original image GB with left and right reversed from the original image, for the sake of convenience. Since the first and second sub-electronic imaging units 40, 50 are installed at the same height position in the main body 12, the position of the subject image in the original image GB usually changes only with respect to the value of the X coordinate, and the value of the Y coordinate remains unchanged at zero. The subject image positioned at distance L1 appearing at the center of the original image GA is therefore shown in the original image GB centered at position K1 (X1, 0), which corresponds to distance L1. The operation amount of the distance ring 21*c*, which changes according to the distance to the subject, is detected as the operation amount So by the roller position sensor 29*a*, and the distance L can therefore be derived based on the operation amount So. Therefore, by deriving the distance L from the operation amount So, calculating the angle θ from the derived distance L and Equation (1), and setting the relationship between the angle θ and the value of the X coordinate in advance, the X coordinate value that corresponds to the angle θ, i.e., the cutout position K, can be derived. In the present embodiment, the relationship between the operation amount So and the cutout position K is stored as the cutout rule Rk. This cutout rule Rk is stored as a relational expression with respect to the operation amount So and the cutout position K, and in the case of calculating the cutout position K, this relational expression is used to calculate the cutout position K from the operation amount So. The maximum value of the angle θ is determined by the angle of view of the sub-lens 51, and the relationship between the angle θ and the X coordinate value can be set from the corresponding X coordinate value.

$$\tan \theta = A/L \qquad (1)$$

Figure 6:
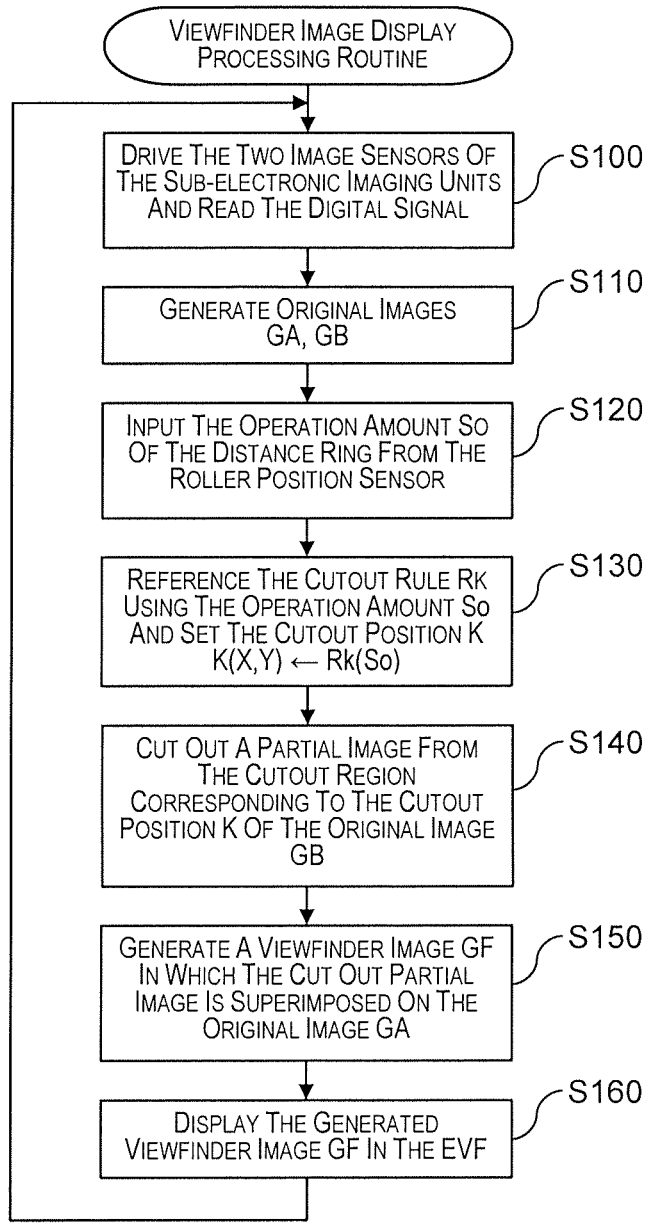
FIG. 6 is a flowchart showing an example of the viewfinder image display processing routine.

The operation of the digital camera 10 of the present embodiment thus configured will next be described. FIG. 6 is a flowchart showing an example of the viewfinder image display processing routine executed by the main controller 30. This routine is executed from the time when a power supply button (not shown) is switched on, and an imaging mode is performed until the power supply button is switched off. Image processing, display control, and other processing is actually performed mainly by the image processor 70 and the display controller 80, but no particular distinction is made between main areas of processing in the following description. When the viewfinder image display processing routine is executed, the main controller 30 first drives the image sensors 42, 52 of the first and second sub-electronic imaging units 40, 50 and reads the digital signals (step S100). Various types of image processing are then applied to the read digital signals to generate original images GA, GB (step S110). When the original images GA, GB are generated, the operation amount So of the distance ring 21*c* from the roller position sensor 29*a* is inputted (step S120), and the inputted operation amount So is used to set the cutout position K with reference to the cutout rule Rk (step S130).

Figure 7:
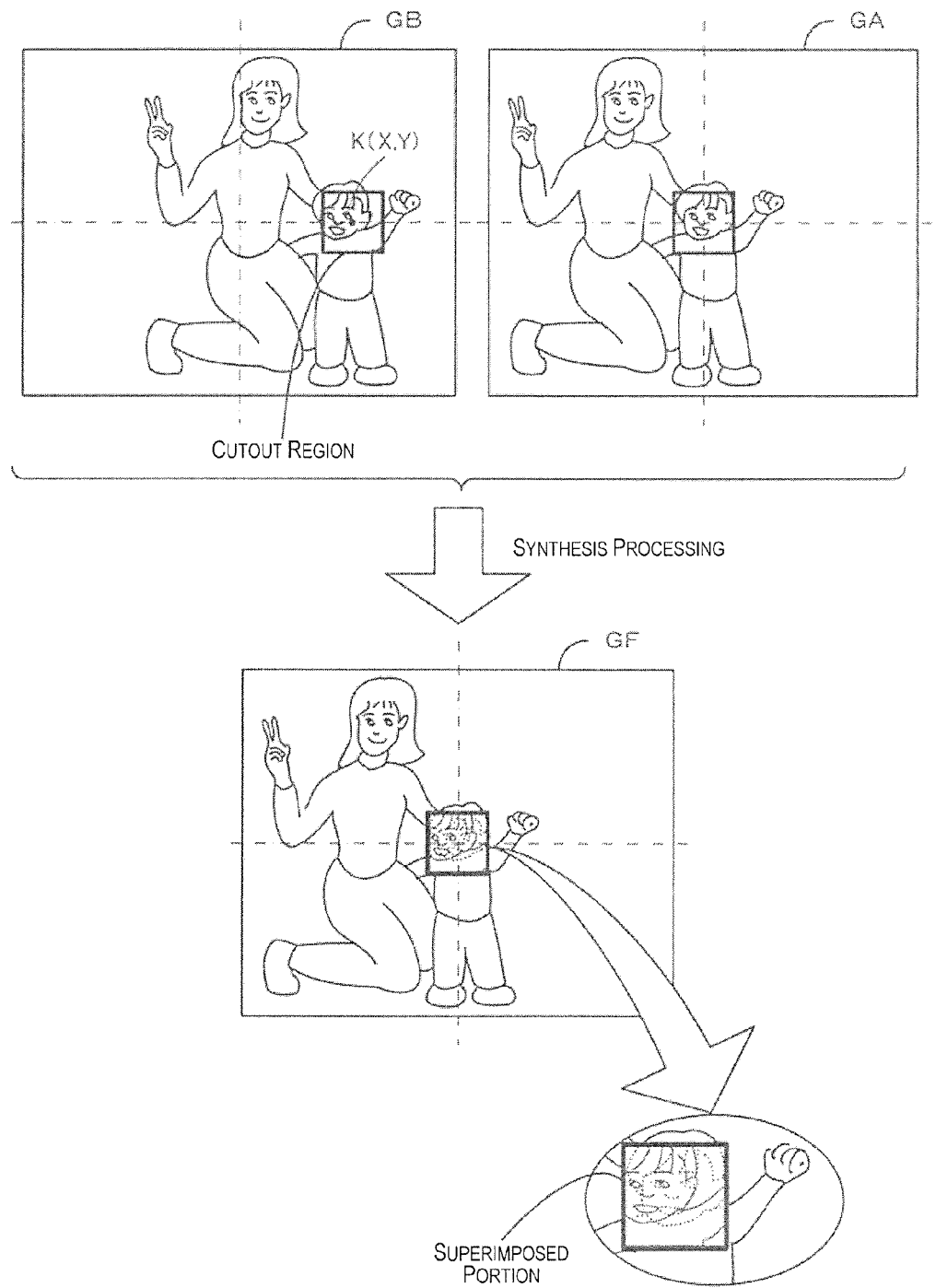
FIG. 7 is a view showing the generated viewfinder image.

When the cutout position K is thus set, a partial image is cut out from a cutout region of a predetermined size that corresponds to the cutout position K of the original image GB (step S140), and a viewfinder image GF is generated, wherein the cut partial image is superimposed in the center of the original image GA (step S150). The viewfinder image GF is generated by generating pixel values of the superimposed portion by α blending in which the pixel values b of the original image GB and the pixel values a of the original image GA are mixed based on a coefficient α for indicating the transparency of the top original image GB with respect to the bottom original image GA. The pixel values a of the original image GA are used to generate the portion outside the superimposed portion. FIG. 7 is a view showing the generated viewfinder image GF. As shown in FIG. 7, the superimposed portion of the viewfinder image GF is generated as a double image by α blending. The left and right of the original images GA, GB are also reversed in FIG. 7 in the same manner as in FIG. 5, and in the superimposed portion, the partial image from the original image GB is indicated by solid lines, and the original image GA is indicated by dotted lines.

When the viewfinder image GF is generated in this manner, the generated viewfinder image GF is displayed in the EVF 82 (step S160), the process returns to step S100 and repeats. The cutout position K can thus be set from the cutout rule Rk by using the operation amount So from the roller position sensor 29*a*, which reflects the focus position of the main electronic imaging unit 20, and a viewfinder image GF can be displayed wherein the partial image cut out in accordance with the cutout position K is superimposed on the original image GA.

Figure 8:
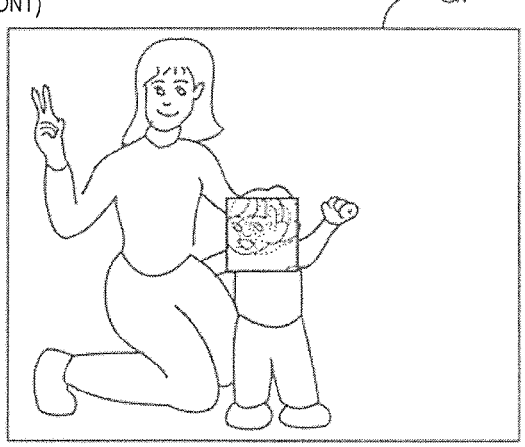
FIG. 8 is a view showing the relationship between the misalignment of the finder image and the focus.
Figure 8:
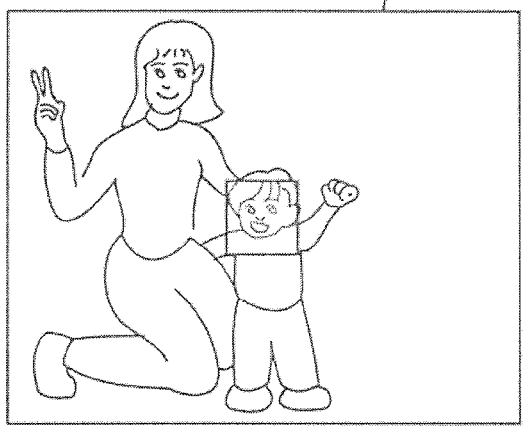
Figure 8:
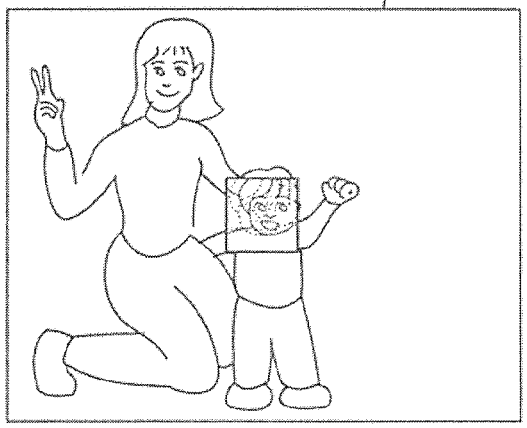

Specifically, a viewfinder image GF can be generated. The double image of the superimposed portion changes in conjunction with the focusing operation of the main electronic imaging unit 20. The cutout position K corresponds to the position of the subject image in the original image GB when the subject at the focus position of the main electronic imaging unit 20 is photographed by the second sub-electronic imaging unit 50. FIG. 8 is a view showing the relationship between the misalignment of the viewfinder image GF and the focus. In FIG. 8(b), there is no misalignment in the superimposed portion, but this means that an image of the correct position is cut out from the subject image in the original image GB, and the subject is in focus. In FIGS. 8(a) and 8(c), however, the misalignment which occurs in the superimposed portion means that an image of an offset position is cut out from the subject image in the original image GB, and the subject is out of focus. In FIG. 8(a), the focus is shifted in front of the subject, and in FIG. 8(c), the focus is shifted inward from the subject. The user can thus adjust the focus while confirming the misalignment of the superimposed portion of the viewfinder image GF.

Figure 9:
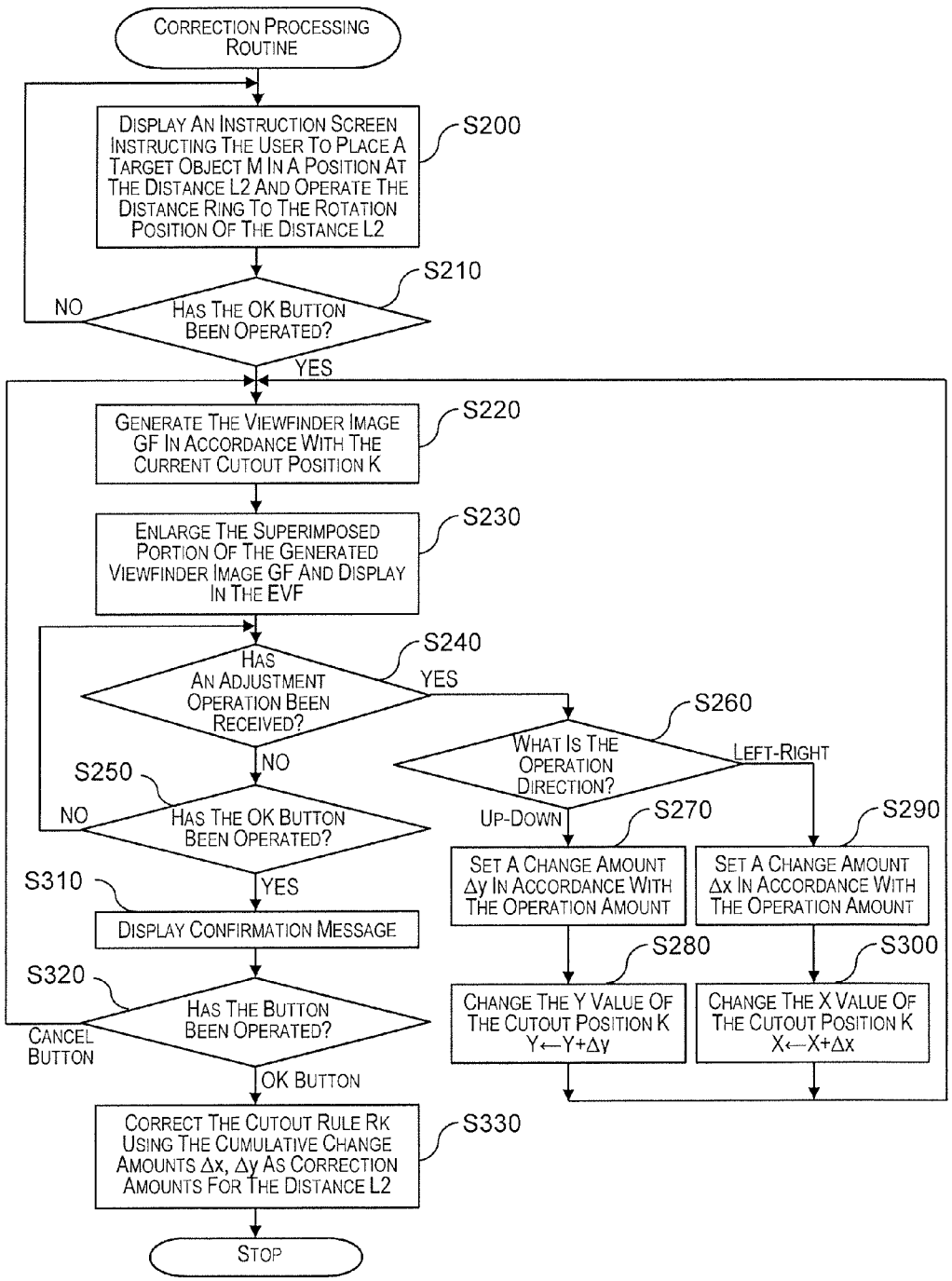
FIG. 9 is a flowchart showing an example of the correction processing routine.

The operation of the digital camera 10 during correction of the cutout rule Rk by the user will next be described. FIG. 9 is a view showing an example of the correction processing routine executed by the main controller 30. This processing is executed when the correction mode is selected by operation of the mode selection button 90d by the user. When this correction processing routine is executed, the main controller 30 displays an instruction screen on the liquid crystal monitor 84 instructing the user to first place a target object M in a position at the abovementioned distance L2, for example, as a reference distance, and operate the distance ring 21c so that the distance scale thereof is at the rotation position indicating the distance L2, and then to press the OK button 90e once the above operations are completed (step S200). The process then waits for the OK button 90e to be operated by the user (step S210), and a viewfinder image GF is generated in accordance with the current cutout position K (step S220). This process is performed in the same manner as that of the viewfinder image display processing routine described above. Since the cutout position K at this time is such that the distance ring 21c is at the rotation position of the distance L2, the cutout position becomes the cutout position K2 (X2, 0) for the distance L2. A viewfinder image GF' in which the superimposed portion of the generated viewfinder image GF is enlarged is then displayed in the EVF 82 (step S230).

Figure 10:
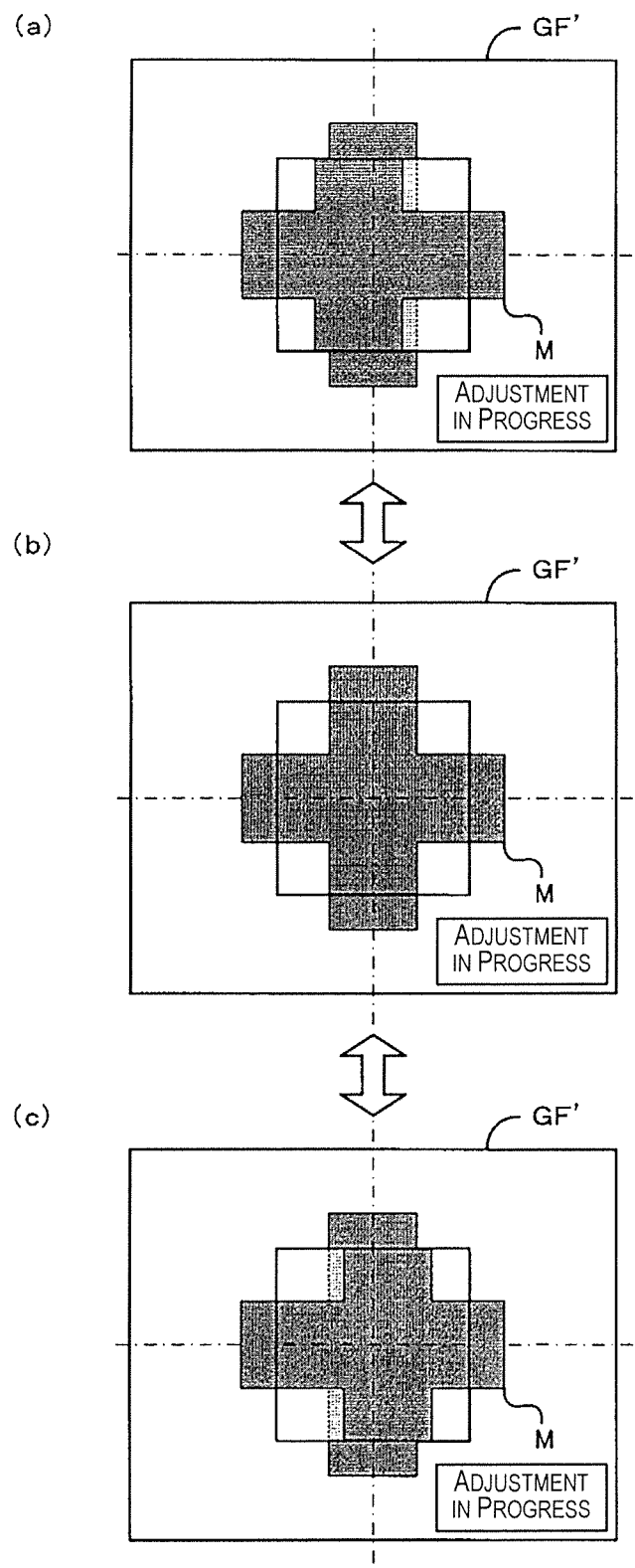
FIG. 10 is a view showing an example of the finder image in the correction mode.
Figure 11:
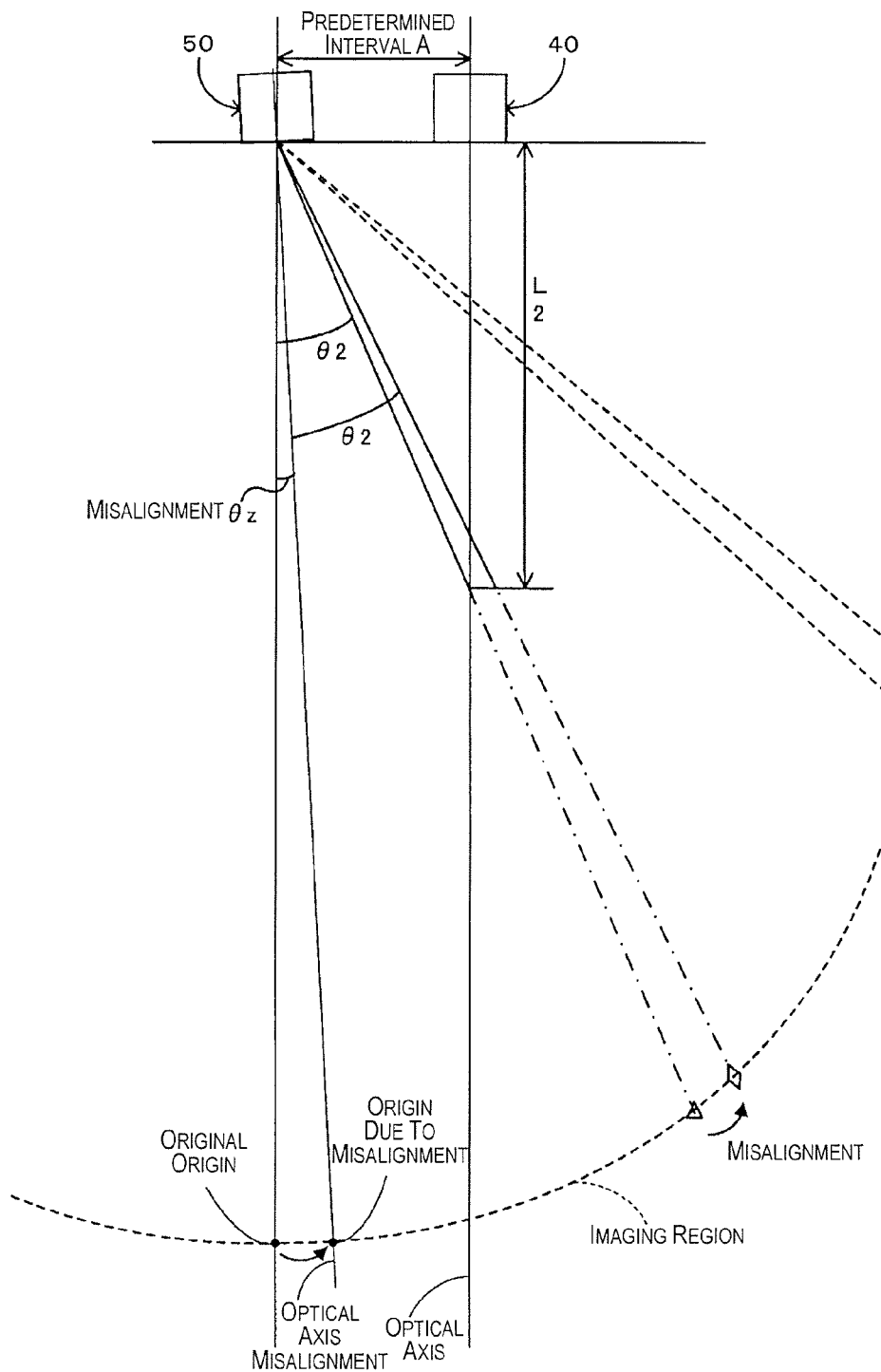
FIG. 11 is a view showing a state in which the position of the second sub-electronic imaging unit is misaligned.

FIG. 10 is a view showing an example of the viewfinder image GF' in the correction mode. As shown in FIG. 10, the superimposed portion is enlarged in the display, and a message is displayed indicating that adjustment is in progress. Under ordinary circumstances, a viewfinder image GF' is displayed. There is no misalignment in the superimposed portion, as shown in FIG. 10(b). However, when the positions or angles of the first and second sub-electronic imaging units 40, 50 are offset due to some abnormality such as an impact or the like, misalignment can occur in the superimposed portion. FIG. 11 is a view showing a state in which the position of the second sub-electronic imaging unit 50 is misaligned. As shown in FIG. 11, the optical axis of the second sub-electronic imaging unit 50 is offset by an angle θz. The origin of the imaging region is therefore offset, and even when the cutout position K is set based on the cutout rule Rk, the cutout position happens to be in a different position than during normal operation, and the correct partial image is not cut out from the original image GB. Consequently, the superimposed portion of the viewfinder image GF' is misaligned, as shown in FIGS. 10(a) and 10(c). FIG. 10 shows a case in which misalignment occurs in the left-right direction, but depending on the direction of the positional offset, misalignment may also occur in the up-down direction.

When the viewfinder image GF' is thus displayed, the process waits for an adjustment operation by the JOG dial 90g (step S240) or operation of the OK button 90e (step S250). When an adjustment operation is executed, a determination is made as to whether the adjustment is in the up-down direction or the left-right direction (step S260). As described above, the adjustment is determined to be in the up-down direction when the JOG dial 90g is operated upward, and the adjustment is determined to be in the left-right direction when the JOG dial 90g is operated downward. When the adjustment is determined to be in the up-down direction, a change amount Δy is set in accordance with the operation amount of the JOG dial 90g (step S270), and the Y value of the cutout position K (X, Y) is changed (step S280). When the JOG dial 90g is rotated to the right in a state of being drawn upward, a positive value is set for the change amount Δy to indicate a change in the upward direction, and when the JOG dial 90g is rotated to the left, a negative value is set for the change amount Δy to indicate a change in the downward direction. When the adjustment is determined to be in the left-right direction, a change amount Δx is set in accordance with the operation amount of the JOG dial 90g (step S290), and the X value of the cutout position K (X, Y) is changed (step S300). When the JOG dial 90g is rotated to the right in a state of being drawn downward, a positive value is set for the change amount Δx to indicate a change in the right-hand direction, and when the JOG dial 90g is rotated to the left, a negative value is set for the change amount Δx to indicate a change in the left-hand direction.

When the cutout position K is thus changed, the process returns to step S220 and repeats, and adjustment operations from the user are repeatedly received until the presence of misalignment in the viewfinder image GF' is no longer confirmed. When a determination is made in step S250 that the OK button 90e has been operated, a confirmation message inquiring as to whether to correct the cutout rule Rk according to the current cutout position K is displayed in the EVF 82 (step S310), and the process waits until a button operation is executed (step S320). When the cancel button 90f is operated in step S320, the process returns to step S220 and repeats. On the other hand, when the OK button 90e is pressed in step S320, the cutout rule Rk is corrected by using a change amount ΔX (the cumulative value of the change amount Δx) and a change amount ΔY (the cumulative value of the change amount Δy) as correction values for the distance L2 (step S330), and the routine is completed. At this time, correction is made based on the change amount ΔX and the change amount ΔY as well for cases in which the distance to the subject is not the distance L2, but a change amount ΔX and change amount ΔY may also be acquired for each of a plurality of reference distances and the cutout rule Rk may be corrected based on these acquired change amounts. In the case shown in FIG. 11, for example, since the change amount ΔX gives a value which eliminates the effects of the angle θz of misalignment, the positional offset in the X-axis direction of the cutout position K due to the misalignment of angle θz is considered to correspond to the change amount ΔX. The angle θz of the misalignment can therefore be calculated from the relationship between the original angle θ2 and the value X2, and the relationship between the angle (θ2+θz) and the value (X2+ΔX). When the distance L is derived from the operation amount So to calculate the angle θ, the cutout rule Rk is corrected so that this angle θz of misalignment is reflected. When the change amount ΔY is set, unlike the case shown in FIG. 11, the optical axis is considered to be misaligned in the up-down direction. Therefore, although the Y value of the cutout position K was originally 0, this value is corrected to ΔY. It is thus possible for the user to correct the cutout rule Rk by a simple method.

Figure 12:
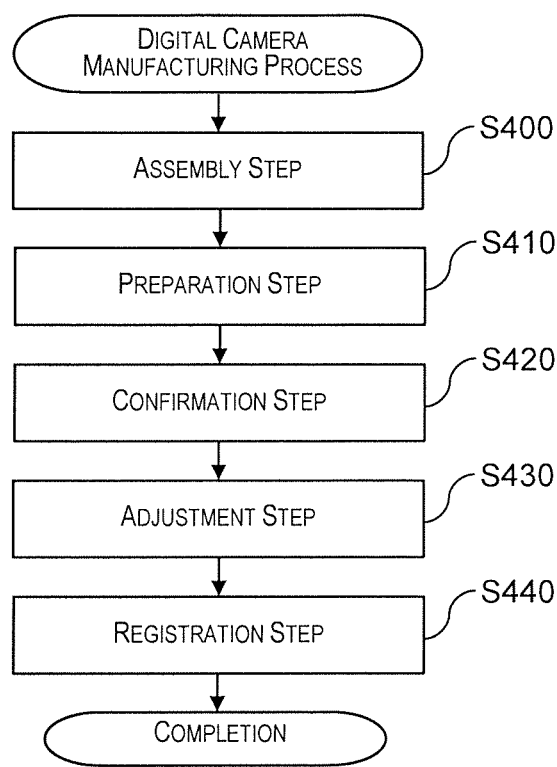
FIG. 12 is a view showing an example of the steps for manufacturing the digital camera.

The cutout rule Rk of the digital camera 10 at the time of shipping reflects individual differences in each digital camera 10, and is registered in the process of manufacturing the digital camera 10. This process will be described hereinafter along with the method for manufacturing the digital camera 10. FIG. 12 is a view showing an example of the manufacturing process of the digital camera 10. In the manufacturing process of the digital camera 10, the constituent parts are first assembled in the main body 12 (step S400). In this assembly step, the main electronic imaging unit 20, the first and second sub-electronic imaging units 40, 50, the image processor 70, the display controller 80, the EVF 82, the liquid crystal monitor 84, the operating switch group 90, the main controller 30, and other components are installed in the main body 12. At this time, a default cutout position k1 (x1, 0) for the reference distance L (distance L1 in this case) for generating the cutout rule Rk is registered in the flash memory 38. When the digital camera 10 is thus assembled, preparation is made for generating the cutout rule Rk (step S410). In this preparation step, a power button (not shown) of the digital camera 10 is switched on, the digital camera 10 is fixed to a tripod or the like, a target object M is placed in a position at the distance L1 from the fixed digital camera 10, and the distance ring 21c is rotated to the position at which the distance scale indicated thereon shows the distance L1. At this time, the switching on of the power button of the digital camera 10 causes the viewfinder image display processing routine described above to be executed. A viewfinder image GF generated in accordance with the default cutout position k1 is therefore displayed in the EVF 82.

When the viewfinder image GF is thus displayed, the misalignment of the superimposed portion of the displayed viewfinder image GF is confirmed (step S420). Slight misalignment may occur in the superimposed portion at this time due to individual differences between digital cameras 10. Individual differences between digital cameras 10 occur due to manufacturing or assembly error in the first and second sub-electronic imaging units 40, 50, the coupled roller 29, and other parts, or to such factors as the characteristics of the image sensors 42, 52. When misalignment is confirmed in the confirmation step, positional adjustment is performed until the misalignment can no longer be confirmed (step S430). This positional adjustment is performed in the same manner as the adjustment processing in the correction processing routine shown in FIG. 9. When misalignment can no longer be confirmed, a cutout rule Rk is generated as the cutout position for the distance L1 and registered in the flash memory 38 (step S440). The cutout rule Rk is generated in the same manner as the cutout rule Rk is corrected in the correction processing routine shown in FIG. 9. For example, when adjustment is made with respect to the X-axis direction, when the angle θz of the misalignment is calculated from the adjustment amount, and the angle θ is calculated from the operation amount So, the cutout rule Rk is generated so that the angle θz of the misalignment is reflected. It is thereby possible to adapt to misalignment in the left-right direction. When adjustment is made with respect to the Y-axis direction, the value of the Y coordinate is set from the adjustment amount and added to the default value of 0 to generate the cutout rule Rk. It is thereby possible to adapt to misalignment in the up-down direction. Consequently, misalignment that accompanies individual differences due to assembly error and other factors in the digital camera 10 can be eliminated, and a highly precise cutout rule Rk can be generated and registered.

The correlation between constituent elements of the present embodiment and constituent elements of the present invention will next be clarified. The EVF 82 of the present embodiment is an example of the "image display unit" of the present invention. The first sub-electronic imaging unit 40 in an example of the "first imaging unit." The second sub-electronic imaging unit 50 is an example of the "second imaging unit." The roller position sensor 29a is an example of the "operation amount acquiring unit." The main controller 30 and image processor 70 are an example of the "composite image generation unit." The display controller 80 is an example of the "display control unit." The JOG dial 90g is an example of the "instruction receiving unit," and the main controller 30 is an example of the "correcting unit."

According to the digital camera 10 of the present embodiment described in detail above, the operation amount So of manual focusing is acquired, the predetermined cutout rule Rk is referenced using the acquired operation amount So to set a cutout position K at which an image is partially cut out from the original image GB generated by the second sub-electronic imaging unit 50, a partial image is cut out from the original image GB in accordance with the set cutout position K and superimposed on the original image GA generated by the first sub-electronic imaging unit 40 to generate a viewfinder image GF, and the generated viewfinder image GF is displayed in the EVF 82. A viewfinder image GF in which the two original images GA, GB are superimposed can therefore be generated and displayed by a simple configuration without the use of a complex mechanism.

By performing the correction mode in order for the cutout rule Rk to be corrected in accordance with a change amount set by a user operation, the cutout rule Rk can be corrected by the user. Since the superimposed portion of the viewfinder image GF' in the correction mode is enlarged in the display, misalignment is easily confirmed, and the cutout rule Rk can be smoothly corrected. Since the first and second sub-electronic imaging units 40, 50 also have the same configuration, the partial image cut out from the original image GB can be superimposed on the original image GA without being enlarged or otherwise modified.

The present invention shall not be construed as being limited by the embodiment described above, and various embodiments of the present invention are possible within the technical scope of the present invention.

In the embodiment described above, a captured image is generated based on an image signal obtained by photoelectric conversion of the image of a subject by the main electronic imaging unit 20, but the present invention is not limited to this configuration, and a silver salt camera may also be employed for generating a captured image by transferring an image of a subject to a silver film instead of by the main electronic imaging unit 20.

In the embodiment described above, the first and second sub-electronic imaging units 40, 50 are installed in the main body 12 so as to be at the same height, but the present invention is not limited to this configuration, and the first and second sub-electronic imaging units 40, 50 may be installed at different heights.

In the embodiment described above, the viewfinder images GF, GF' are displayed in the EVF 82, but the present invention is not limited to this configuration, and the viewfinder images GF, GF' may be displayed on the liquid crystal monitor 84.

In the embodiment described above, the cutout rule Rk is referenced using the operation amount So, and the value of the X coordinate is obtained by calculation, but the present invention is not limited to this configuration. For example, a cutout position K may be registered in advance as a map for each representative distance displayed in the distance scale of the distance ring 21c, or numerous cutout positions K may be registered in advance as a map.

In the embodiment described above, the cutout rule Rk is registered in the flash memory 38, but the present invention is not limited to this configuration, and the cutout rule Rk may also be registered in the ROM 34. In this case, the correction amount with respect to the cutout rule Rk is registered in the flash memory 38.

In the embodiment described above, the amount of rotation of the distance ring 21c is detected via the coupled roller 29, but the amount of rotation may also be directly detected by detecting the rotation angle of the distance ring 21c.

In the embodiment described above, the viewfinder image GF is generated by using a blending to superimpose the two original images GA, GB without modification thereof, but a configuration may be available, the configuration in which the viewfinder image GF is generated by using α blending to superimpose the original images GA, GB after changing the color of at least one of the original images GA, GB. In this case, the image of the superimposed portion of the original image GA, or the partial image cut out from the original image GB may be displayed in monochrome or in an amber color or other color. The image of the superimposed portion of the original image GA and the partial image cut out from the original image GB can thereby be more easily distinguished.

In the embodiment described above, the cutout position K and the cutout region are established without consideration for rotation about the optical axis in the first and second sub-electronic imaging units 40, 50, but a configuration may be available, the configuration in which the cutout position K and cutout region reflect rotation about the optical axis in the first and second sub-electronic imaging units 40, 50, and misalignment in the rotation direction does not occur in the superimposed portion when the subject is in focus. In this case, it is preferred that a correction corresponding to the rotation be performed also during correction of the cutout rule Rk, and that information corresponding to the rotation be included in the cutout rule Rk.

In the embodiment described above, the amount of rotation of the distance ring 21c is detected via the coupled roller 29 during generation or correction of the cutout rule Rk, but a configuration may be available, the configuration in which a reference distance L is specified during generation or correction of the cutout rule Rk, and the amount of rotation of the distance ring 21c is therefore not detected. In this case, the cutout rule Rk may be generated or corrected in a state in which the imaging lens 21 has not been attached, or has been removed.

In the embodiment described above, adjustment during generation or correction of the cutout rule Rk is performed based on manual operation of the JOG dial 90g by an operator or user, but the present invention is not limited to this configuration, and adjustment may also be performed automatically. For example, an auto-focusing operation can be employed instead of the manual focusing operation. The same images include the main image GM, the sub-image GS, and the composite image can be displayed on a camera which performs the auto-focusing operation.

A method for manufacturing a camera with a focusing function is described next. The method for manufacturing the camera includes an assembly step, a preparation step, an adjustment step, and a registration step.

The assembly step is for assembling image display means for displaying an image, first imaging means for applying a photoelectric conversion to an image of a subject obtained via a lens and generating a first image, second imaging means, which is different from the first imaging means, for applying a photoelectric conversion to an image of a subject obtained via a lens and generating a second image, operation amount acquiring means for acquiring an operation amount of manual focusing, composite image generating means for setting a cutout position at which an image is partially cut from the second image according to a principle of triangulation based on an interval between the lens of the first imaging means and the lens of the second imaging means, and a distance to a subject as derived from the acquired operation amount, and generating a composite image in which the partial image is cut out in accordance with the set cutout position and superimposed on the first image, display control means for controlling the display means so as to display the generated composite image, and storage means for storing various types of data.

The preparation step is for placing a target object at a predetermined reference distance and focusing on the placed target object.

The adjustment step is for performing an adjustment with respect to the set cutout position so that the degree of misalignment is less than or equal to a predetermined value when the composite image is generated by the composite image generating means and misalignment is identified in the superimposed portion of the generated composite image.

The registration step is for generating a cutout rule in which the cutout position and the operation amount acquired by the operation amount acquiring means are correlated, and registering the generated cutout rule in the storage means on the basis of the cutout position that is set when the degree of the misalignment is less than or equal to a predetermined value.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A camera, comprising:
a first imaging unit configured to generate a first image by performing a photoelectric conversion from an image of a subject obtained via a first lens;
a second imaging unit configured to generate a second image by performing a photoelectric conversion from an image of the subject obtained via a second lens, the second imaging unit being different from the first imaging unit;
an focusing amount acquiring unit configured to acquire amount of focusing;
a composite image generating unit configured to set a cutout position for cutting out a partial image of the second image on the basis of the operation amount and a predetermined cutout rule, to cut out the partial image from a cutout region that corresponds to the cutout position of the second image, and to generate a composite image by superimposing the partial image on the first image; and
an image display unit configured to display the composite image,
the image display unit being configured to display the first image and the second image being misaligned with the first image in an area of the first image in which the partial image is superimposed, when the subject is out of the focusing.

2. The camera according to claim 1, wherein
the composite image generating unit is configured to set the cutout position such that amount of misalignment of the partial image in the composite image decreases as the composite image is in focus with the subject through the focusing.

3. The camera according to claim 1, wherein
the predetermined cutout rule includes a principle of triangulation based on an interval between the first lens and the second lens, and distance from the camera to the subject on the basis of the operation amount.

4. The camera according to claim 1, wherein
the predetermined cutout rule is changeable in a correction mode with confirming the misalignment in the composite image when the object at a predetermined reference distance is in focus, and
the camera further includes
an instruction receiving unit configured to receive an instruction to change the cutout position at which degree of the misalignment is equal to or less than a predetermined amount in the correction mode, and
a correcting unit configure to correct the cutout rule by using amount to change the cutout position as amount of correcting the predetermined reference distance in the correction mode.

5. The camera according to claim 4, wherein
the display control unit is configured to control the display unit to display an enlarged image of the partial portion in the composite image in the correction mode.

6. The camera according to claim 1, further comprising
an interchangeable lens unit being configured to use a plurality of lenses with different kinds of focal length, the plurality of lenses being interchangeable, wherein
the first imaging unit and the second imaging unit include a pan-focus lens with the same size of imaging elements and the same focal length.

7. The camera according to claims 1, wherein
the first lens and the second lens are configured such that an attachment position of the first lens is as high as an attachment position of the second lens.

* * * * *